(12) United States Patent
Smrt

(10) Patent No.: US 6,276,574 B1
(45) Date of Patent: Aug. 21, 2001

(54) APPARATUS AND METHOD FOR SELECTIVELY DISPENSING AEROSOLIZED WATER FROM A CONTAINER

(76) Inventor: Thomas J. Smrt, 9716 S. Grant Hwy., Marengo, IL (US) 60152

( * ) Notice: Subject to any disclaimer, the term of this patent is extended or adjusted under 35 U.S.C. 154(b) by 0 days.

(21) Appl. No.: 09/437,859

(22) Filed: Nov. 10, 1999

(51) Int. Cl.[7] ................................................ B67D 5/00
(52) U.S. Cl. .......................... 222/646; 222/52; 222/649
(58) Field of Search .................................. 222/645–649, 222/52

(56) References Cited

U.S. PATENT DOCUMENTS 5,727,715 * 3/1998 McKenna et al. ............... 222/189.09
5,944,284 * 8/1999 Bardel ................................ 244/118.5

* cited by examiner

Primary Examiner—J. Casimer Jacyna
(74) Attorney, Agent, or Firm—Leydig, Voit & Mayer, Ltd.

(57) ABSTRACT

An apparatus and related method for selectively dispensing aerosolized water into the atmosphere to adjust the humidity level thereof is provided.

12 Claims, 3 Drawing Sheets

APPARATUS AND METHOD FOR SELECTIVELY DISPENSING AEROSOLIZED WATER FROM A CONTAINER

FIELD OF THE INVENTION

This invention generally relates to an apparatus and method for selectively dispensing water in the form of an aerosol from a pressurized container.

BACKGROUND OF THE INVENTION

Under certain circumstances, the moisture content of air in an enclosed space (also expressed as relative humidity) can reach undesirably low levels, e.g., in air-conditioned or in heated rooms. The extended inhalation of air having such low relative humidity can lead to certain health problems. For example, dry air dehydrates skin and mucous membranes, leading to dry, itchy skin, aching throats, and irritated sinus membranes.

Low relative humidity levels can be of particular concern to persons who travel. Travelers typically have little or no control over the humidity levels of their hotel guestrooms or workrooms.

Thus, a need exists for an apparatus and method, which can be used to supplement the amount of humidity in an enclosed space when, desired. It would be advantageous if such an apparatus utilized relatively simple components, was portable and low in cost.

SUMMARY OF THE INVENTION

The present invention provides a solution to the foregoing and other problems by providing an apparatus for selectively dispensing aerosolized water.

In one embodiment, an apparatus of the present invention comprises a pressurized container containing a liquid consisting essentially of water and a propellant capable of aerosolizing the water upon discharge from the container, a valve mounted onto the container capable of moving between discharging and non-discharging positions, and an actuator which is capable of moving the valve between discharging and non-discharging positions.

In a related embodiment, another apparatus of the present invention includes the pressurized container previously described, an electrically-operable actuating means which effects movement of the pressurized container actuator between the discharging and non-discharging positions, and a sensor in electrical connection with the actuating means for detecting the humidity level of the ambient atmosphere, wherein when the sensor detects a certain humidity level, the actuating means moves the aerosol container actuator into the discharging position, thereby providing aerosolized water to be discharged from the container.

The present invention further provides a method for selectively dispensing aerosolized water into the atmosphere to adjust the humidity of the atmosphere. In a preferred embodiment, the method comprises the steps of sensing the humidity of the atmosphere, and dispensing aerosolized water from a pressurized container which comprises a liquid consisting essentially of water and a propellant capable of aerosolizing the water upon discharge from the container into the atmosphere when the selected humidity is sensed.

These and other features and advantages of the invention will be more readily apparent upon reading the following description of a preferred exemplified embodiment of the invention and upon reference to the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

In accordance with one preferred embodiment of the present invention, there is provided an apparatus and a method for selectively dispensing aerosolized water from a pressurized container into an enclosed space, such as a room, an elevator, or the passenger compartment of a motor vehicle. The apparatus and method are useful in situations where the humidity level (water vapor concentration) in an enclosed space falls below a desired level. The ability to overcome the aforementioned concerns by use of the apparatus and method of the present invention, which provide an economical and elegantly simple solution, particularly for those who travel, would be of great benefit.

Figure 1:
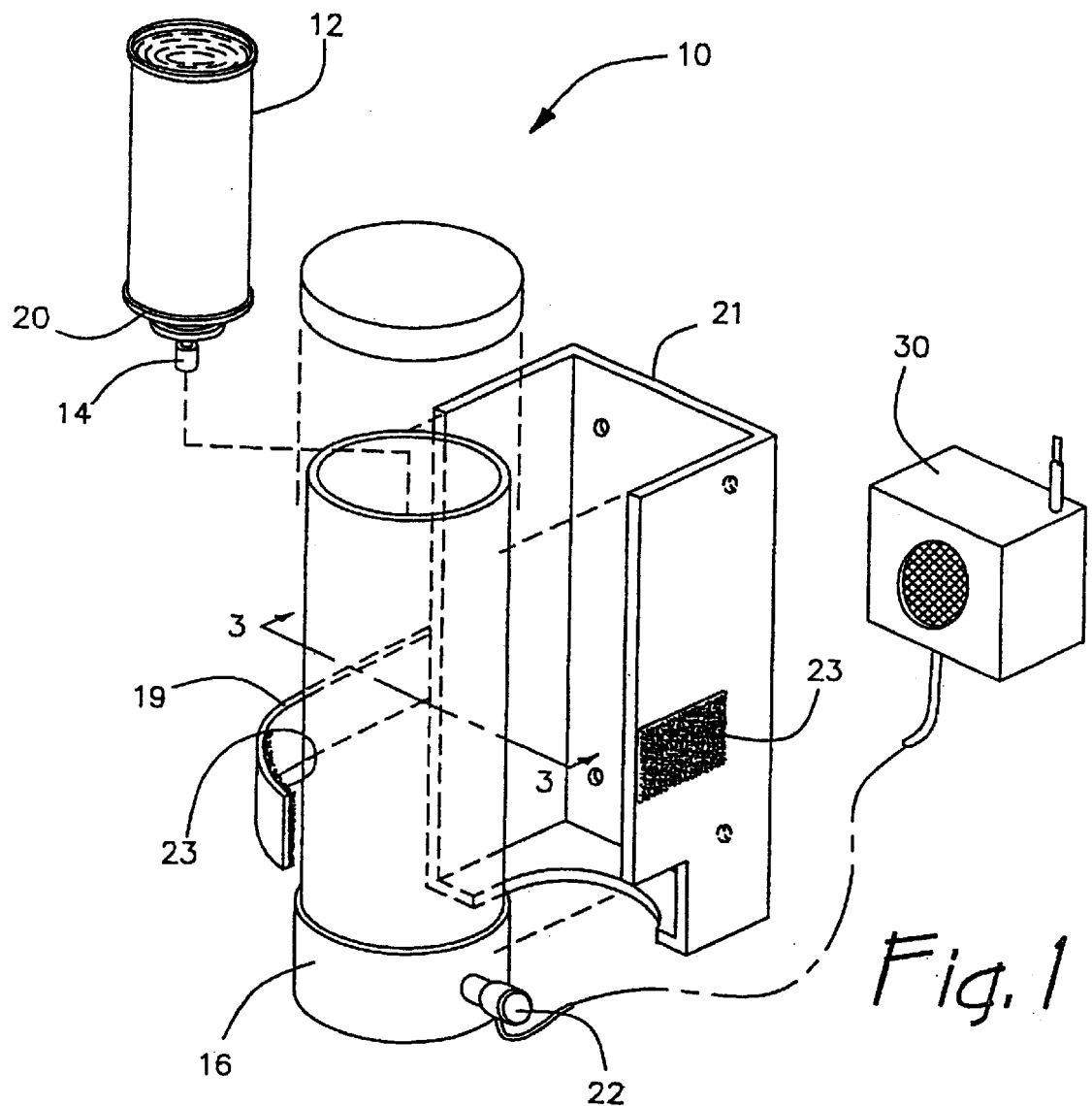
FIG. 1 is a perspective view of an apparatus for selectively dispensing aerosolized water from a pressurized container constructed according to one embodiment of the present invention.
Figure 2:
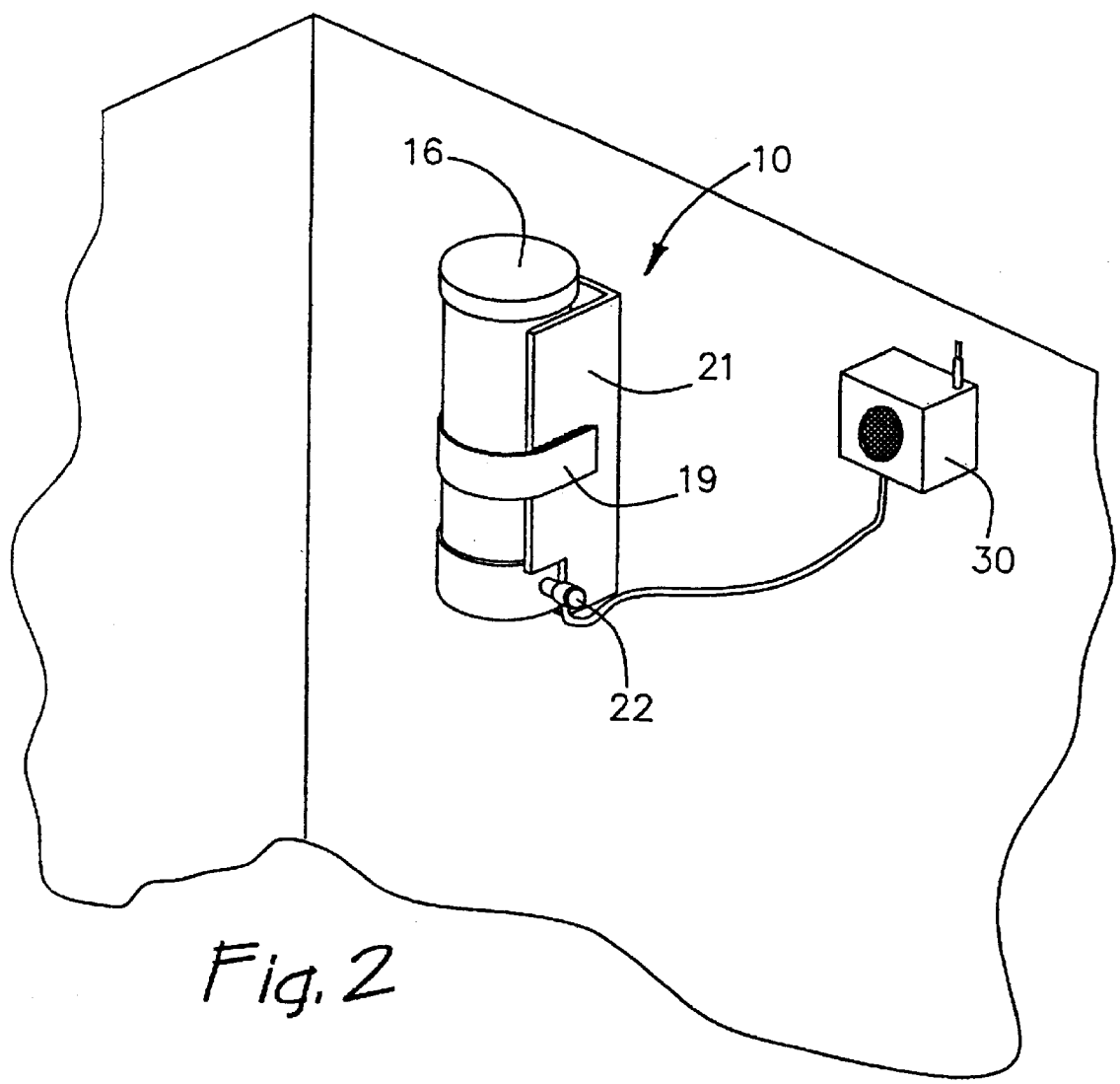
FIG. 2 is perspective view of the aerosolized water dispensing apparatus of FIG. 1 showing how the apparatus could be mounted in an enclosure.
Figure 3:
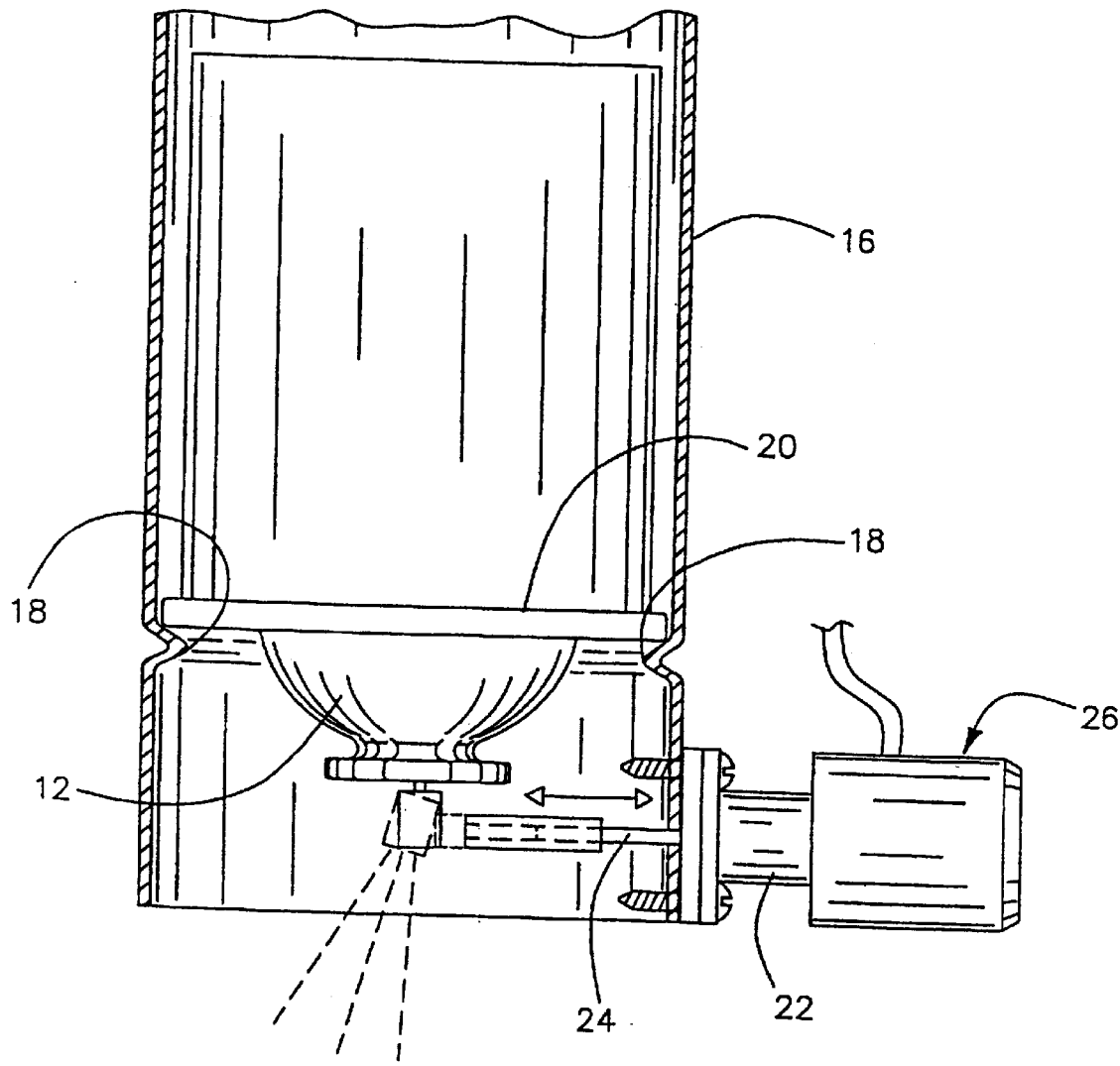
FIG. 3 is a sectional view taken along line 3—3 of FIG. 1 showing the discharging position of the pressurized container actuator and the extended position of the solenoid arm in broken lines and the non-discharging position of the pressurized container actuator and the retracted position of the solenoid arm in solid lines.

Turning to FIGS. 1–3, there is illustrated a preferred embodiment of the aerosolized water dispensing apparatus 10 of the present invention. As shown in the drawings, the apparatus can be used with conventional aerosol containers 12 which are pressurized upon being filled with water. Preferably, the water used to fill the container will be substantially free of any major impurities (in accordance with commercially-established standards of purity), and includes distilled water, bottled water, spring water, mineral water and common tap water.

Propellants useful in connection with the present invention vary widely, with the qualification that they must provide for aerosolization of the water upon discharge from the container. In that regard, the propellants contemplated by the present invention include one or more liquid propellants. By use of the term "liquid propellant," it is contemplated that such propellant is gaseous at room temperature but liquid under pressures found within an aerosol container. The propellant selected should also be inert, i.e., it should not adversely affect the desirable properties of the water before discharge. Liquid propellants suitable for use in the present composition include non-halogenated hydrocarbons, e.g., methane, ethane, propane, butane, and isobutane, halogenated hydrocarbons, e.g., Freon 12, and ethers, e.g., dimethyl ether. Mixtures of these liquid propellants are also acceptably included into the present composition.

The quantity of propellant utilized in the aerosol compositions of the present invention is typically determined by reference to the vapor pressure inside the aerosol container. Generally, when the vapor pressure reaches a range of about 30 to 85 psig at 70° F., a sufficient amount of propellant has been introduced. Preferably, the pressure ranges from about 40 to 80 psig at 70° F.

Advantageously, the present invention provides an aerosol composition that is non-flammable. As the primary components in the composition are propellant(s) and water, the selection of the propellant will have the most influence on the flammability of the composition. If low flammability is a desirable property, the propellant should be selected according to its combustibility, as described in more detail below.

Turning initially to flammability of the composition, the test for flammability as that term is used herein is the "Flame Projection Test." This test was originally developed by the American Association of Railroads, Explosives Division, the United States Department of Agriculture, and the Aerosol Division of the CSMA. This test, which is well known in the art, may be found in the CSMA "Aerosol Guide" (7th ed. April, 1981) at page 14, as well as in "The Aerosol Handbook" (2d ed.) by M. A. Johnson at pages 211–212.

Generally, the test contemplates shaking an aerosol dispenser, which is filled with the composition, and then orienting the dispenser in an upright position, unless the label states otherwise. The dispenser is subsequently placed six inches from a flame source in a draft-free area. The actual test is run for four seconds, i.e., the dispenser is discharged in the direction of the flame for four seconds. During discharge, the composition is sprayed through the top one-third of the flame.

In assessing the results, page 18 of the aforesaid CSMA Aerosol Guide deems a composition "Flammable" when the aerosol, during the "Flame Projection Test," produces a "Flashback" which touches the actuator of the dispenser. A flame length of less than eighteen inches in length, in combination with the absence of "Flashback," indicates the composition is non-flammable. A composition is considered to be "Extremely Flammable" by the CSMA when a "Flashback" is produced during the aforementioned test, and when the composition exhibits a flash point of less than 20° F. according to the "Tag Open-Cup Flash Point Test" of the CSMA.

Turning now to propellant combustibility, non-combustible liquid propellants, which are advantageously used in the present invention, are those having extremely high ignition temperatures, in excess of about 200° C. More preferably, highly non-combustible propellants are used, these being defined as not ignitable until exposed to a temperature in excess of about 500° C. Most preferably, very highly non-combustible propellants are used, which are defined as propellants having an ignition temperature in excess of about 700° C. One example of a preferred non-combustible liquid propellant is 1,1,1,2-tetrafluoroethane, which is commercially available under the trademark Dymel® 134a (DuPont Chemicals) or KLEA® 134a (ICI Americas Inc.).

Container useful in the present invention are numerous, and are preferably those used to hold aerosol paints. This type of container is preferred because it is relatively inexpensive, can be pressurized, and allows a consumer to readily transport and change-out containers after use. It should be appreciated, however, that any type of container that is compatible with this and other aspects of the present invention may be utilized.

The pressurized container 12 also includes an actuator 14 that moves between non-discharging and discharging positions, thereby controlling the valve which in turn controls the discharge of the composition from the container. The actuator and valve should advantageously be selected to provide for the expulsion of the water-containing composition in the form of a fine mist. Of course, and as is well understood by those skilled in the art, the liquid propellant is the primary component affecting the condition of the composition discharged from the container, e.g., in an aerosol or mist condition. Using the teachings herein, those skilled in the art will be readily able to select the appropriate valve and actuator combination that will achieve this effect.

In one embodiment, the aerosolized water dispensing apparatus 10 may further includes means for mounting the container 12. This means, in combination with an electrically-operable actuator (described in more detail below) permits the aerosolized water that is discharged from the pressurized container to be dispensed into an enclosed space at preselected intervals. As will be appreciated by those skilled in the art, there are any number of different configurations of mounting structures, and mounting positions, that can be used to mount the container such that it will dispense aerosolized water into the enclosed space. Preferably, the mounting means is configured such that the container can be easily removed and replaced when the water in the container is exhausted.

In a preferred embodiment, the container mounting means comprises a generally cylindrical structure 16, which is adapted to receive and securely retain the container 12, as exemplified in FIG. 1. In the illustrated embodiment, the cylindrical structure 16 includes an annular flange 18, which serves to properly align and position the container within the cylindrical structure. The annular flange includes a central opening, which allows the top of the container including the actuator 14, to extend therethrough. The annular flange 18 is sized to contact a ridge portion 20, which extends from a typical aerosol (e.g., paint) container. Unlike the illustrated embodiment wherein the container 12 is held in the inverted position, in another embodiment, the mounting structure 16 could be configured such that container is held in an upright or other position, as the orientation of the container is of no consequence regarding the ability of the container to discharge aerosolized water into the enclosed space.

Those skilled in the art will also appreciate that the container 12 could also be mounted in any number of different locations. For example, the aerosol container 12 could be mounted onto a surface, which defines the enclosed space, e.g., a wall of a room as shown in FIG. 2. Alternatively, the container 12 could be mounted to the ceiling of such a room, or outside of the enclosure, e.g., air supply ducts, where the aerosolized water could be dispensed within the enclosed space. In the illustrated embodiment, the cylindrical structure 16 with the container 12 can be mounted on a surface such as a wall via a mounting bracket 21. The mounting bracket 21 is adapted such that the cylindrical structure 16, and with it the container 12, can be easily removed and replaced. In particular, the cylindrical structure 16 is held in the mounting bracket by a strap 19, which is provided with a conventional hook and loop fastener 23.

In another alternative, the apparatus can simply be placed on a table or other surface next to a user. For example, the apparatus can be placed on a nightstand so it can automatically supplement the humidity level adjacent the user's body while the user is asleep.

In order to effectuate the preferred automatic movement of the container actuator 14 between the discharging and non-discharging positions, the dispensing apparatus includes electrically operable actuator. Preferably, the actuator comprises a solenoid 22 that includes an arm 24 mounted to a housing 26, as exemplified in FIG. 3. The solenoid arm 24 is mounted to the solenoid housing 26 so that the solenoid arm 24 can move relative to the solenoid housing between retracted or non-discharging and extended or discharging positions in response to a flow of current to the solenoid 22.

Generally, discharge of the container contents is affected by moving the container actuator 14 from its normal, non-discharging, position into a discharging position, wherein the spring-biased container valve (not shown) is opened. While various types of actuators and biased valves may be used, and are well known in the art (as further described above), valves that are opened when the actuator is moved laterally with respect to the longitudinal axis of the container are preferred. Of course, and as will be appreciated by those skilled in the art, the electrically-operated actuator could be designed to accommodate one or more types of aerosol container valve and actuator combinations.

In the illustrated embodiment, when the solenoid 22 is energized, the arm 24 extends outwardly from the solenoid 22 in a direction transverse to the longitudinal axis of the container actuator 14 into the extended or discharging position, shown in broken lines in FIG. 3. In the extended or discharging position, the solenoid arm 24 effects movement of the container actuator 14 into the discharging position, thus opening the container valve and allowing water in the container to be discharged. When the solenoid 22 is de-energized, a spring (not shown) in the aerosol container valve (not shown) biases the actuator 14 back into the non-discharging position, thereby pushing the solenoid arm 24 back into the retracted or non-discharging position, shown in solid lines in FIG. 2, and closing the container valve.

The dispensing apparatus also includes a sensor 30 disposed in the enclosed space and in electrical connection with the actuator 22 for detecting a preselected property (e.g., humidity level) of the atmosphere in the space. When the sensor 30 detects the preselected property, it signals the actuating means, the solenoid 22 in the illustrated embodiment, to effect movement of the container actuator 14 into the discharging position, thereby dispensing aerosolized water into the enclosed space. The dispensing apparatus 10 can be configured such that the actuator 22 will continue to cause the container 12 to dispense aerosolized water into the space until the sensor 30 no longer detects the selected property. Alternatively, the dispensing apparatus 10 can be configured so that when the actuator 22 receives a signal from the sensor 30 it will cause the aerosol container 12 to dispense aerosolized water into the space for a predetermined interval, e.g., 1–30 seconds.

The sensor is chosen so that when it detects the preselected property, it will forward a signal to the actuating means that aerosolized water should be dispensed into the space. For example, in one embodiment, the sensor 30 may comprise one or more humidity sensors which signal the actuating means when the humidity in the ambient atmosphere in the space drops below a predetermined level. In addition to signaling the actuating means when the humidity level drops below the predetermined level, the sensor could also be configured to sound an alarm.

Those skilled in the art will appreciate that any number of commercially available humidity sensors could be used in the present invention without adversely effecting the performance and other advantages of the present invention.

Multiple aerosolized water dispensing apparatuses may be provided in a given area. These multiple dispensing apparatuses could share the same sensor such that aerosolized water would be dispensed from multiple aerosol containers when the sensor detects the selected characteristic.

In an alternative embodiment, instead of utilizing a sensor, a timer (not shown) could be provided in electrical connection with the actuating means 22. More particularly, the timer could be configured to signal the actuating means at a predetermined interval (e.g., every hour, every two hours, or every four hours) in order to dispense aerosolized water into the enclosed space at a regular interval. Such an arrangement may be preferable in environments where regular dispensing of aerosolized water is desirable, e.g., short- or long-term health care facilities.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A portable apparatus for selectively dispensing aerosolized water into the atmosphere comprising a pressurized container comprising a liquid consisting essentially of water and a liquid propellant capable of aerosolizing the water upon discharge from the container, a valve mounted on the container movable between discharging and non-discharging positions, an actuator mounted on the valve capable of moving the valve between discharging and non-discharging positions, an electrically-operable actuator which effects movement of the pressurized container actuator between the discharging and non-discharging positions, and a sensor in electrical connection with the actuating means for detecting a preselected property of the atmosphere, wherein when the sensor detects the certain preselected property, the actuating means moves the aerosol container actuator into the discharging position, thereby causing aerosolized water to be discharged into the atmosphere, wherein the apparatus is capable of being transported as a unit from one enclosed space to another enclosed space and used to discharge aerosolized water into the atmosphere of each such enclosed space.

2. The apparatus of claim 1 wherein the actuating means comprises a solenoid.

3. The apparatus of claim 2 wherein the solenoid includes an arm attached to the solenoid for movement relative to the actuator such that, when the solenoid is in the discharging position, the arm contacts and displaces the container actuator into the discharging position.

4. The apparatus of claim 1 further including a mounting bracket onto which the pressurized container, actuator and sensor are mounted.

5. The apparatus of claim 1 wherein the sensor comprises a device, which detects the humidity level in the atmosphere.

6. The apparatus of claim 1 wherein when the sensor detects the preselected property, the actuating means moves the actuator into the discharging position for a predetermined period of time.

7. The apparatus of claim 1 wherein when the sensor detects the selected property, the actuating means moves the actuator into the discharging position until the detection means no longer detects the selected property.

8. A method for selectively dispensing aerosolized water into an atmosphere, the method comprising the steps of sensing the atmosphere for a selected property, and automatically dispensing aerosolized water from a portable apparatus when the selected property is sensed, the portable apparatus comprising a pressurized container comprising a liquid consisting essentially of water and a liquid propellant capable of aerosolizing the water upon discharge from the container, a valve mounted on the container movable between discharging and non-discharging positions, an actuator mounted on the valve capable of moving the valve between discharging and non-discharging positions, an electrically-operable actuator which effects movement of the pressurized container actuator between the discharging and non-discharging positions, and a sensor in electrical connection with the actuating means for detecting a preselected property of the atmosphere, wherein when the sensor detects the certain preselected property, the actuating means moves the aerosol container actuator into the discharging position, thereby causing aerosolized water to be discharged into the atmosphere, wherein the apparatus is capable of being transported as a unit from one enclosed space to another enclosed space and used to discharge aerosolized water into the atmosphere of each such enclosed space.

9. The method of claim 8 further including the step of halting the dispensing of aerosolized water from the aerosol container after a predetermined interval.

10. The method of claim 8 further including the step of halting the dispensing of aerosolized water when the selected property is not sensed.

11. The method of claim 8 wherein the selected property is the humidity of the atmosphere.

12. A portable apparatus for selectively dispensing aerosolized water into an atmosphere comprising a pressurized container comprising a liquid consisting essentially of water and a liquid propellant capable of aerosolizing the water upon discharge from the container, a valve mounted on the container movable between discharging and non-discharging positions, an actuator mounted on the valve capable of moving the valve between discharging and non-discharging positions, an electrically-operable actuator which effects movement of the pressurized container actuator between the discharging and non-discharging positions, and a sensor in electrical connection with the actuator for detecting a preselected property of the atmosphere, wherein when the sensor detects the certain preselected property, the actuator moves the aerosol container actuator into the discharging position, thereby causing aerosolized water to be discharged into the atmosphere, and a timer in electrical connection with the actuator, which at a predetermined interval signals the actuator, means to move the pressurized container actuator into the discharging position, wherein the apparatus is capable of being transported as a unit from one enclosed space to another enclosed space and used to discharge aerosolized water into the atmosphere of each such enclosed space.

* * * * *